United States Patent
Li et al.

(10) Patent No.: US 9,063,357 B2
(45) Date of Patent: Jun. 23, 2015

(54) METHOD FOR DESPECKLING IN LASER DISPLAY SYSTEMS

(71) Applicant: Jabil Circuit, Inc., St. Petersburg, FL (US)

(72) Inventors: Lin Li, St. Petersburg, FL (US); Israel J. Morejon, Tampa, FL (US); Jinhui Zhai, Oldsmar, FL (US); Evan O'Sullivan, Safety Harbor, FL (US)

(73) Assignee: Jabil Circuit, Inc., St. Petersburg, FL (US)

( * ) Notice: Subject to any disclaimer, the term of this patent is extended or adjusted under 35 U.S.C. 154(b) by 147 days.

(21) Appl. No.: 13/629,155

(22) Filed: Sep. 27, 2012

(65) Prior Publication Data

US 2014/0028934 A1 Jan. 30, 2014

Related U.S. Application Data

(62) Division of application No. 12/052,377, filed on Mar. 20, 2008, now abandoned.

(60) Provisional application No. 60/895,933, filed on Mar. 20, 2007.

(51) Int. Cl.
*G02F 1/135* (2006.01)
*G02F 1/13* (2006.01)
*G02F 1/1337* (2006.01)

(52) U.S. Cl.
CPC .. *G02F 1/1313* (2013.01); *G02F 2001/133738* (2013.01); *G02F 2203/03* (2013.01)

(58) Field of Classification Search
CPC .............. G02B 27/48; G02B 27/1073; G02B 19/0052; G02B 19/0057; H01S 5/4025; H01S 5/005; H01S 5/4075; H01S 5/4093; H01S 5/423; H01S 3/005; H01S 3/0941; H04N 9/3161; H04N 9/3197; G02F 1/133611; G02F 1/13; G02F 1/13342; G02F 1/133504; G02F 1/1336; G02F 1/133753; G02F 1/13476; G02F 2203/24; G02F 2203/58; G02F 1/135; G03B 21/2033
USPC .............. 348/E9.027, E9.026; 349/5, 62, 24, 349/123, 130, 179, 86, 65, 187, 177, 186; 356/497; 362/97.1
See application file for complete search history.

(56) References Cited

U.S. PATENT DOCUMENTS 6,201,588 B1 3/2001 Walton et al.
6,829,028 B2 12/2004 Lai et al.
7,595,850 B2 9/2009 West et al.

(Continued)

*Primary Examiner* — Thoi Duong
(74) *Attorney, Agent, or Firm* — Price Heneveld LLP

(57) ABSTRACT

A device used in laser display systems for despeckling includes a liquid crystal cell disposed in sandwiched relation between an input and a grounded electrode. A glass cover overlies each electrode. In a first embodiment, the cell may include vertically or randomly oriented liquid crystal molecules and the liquid crystal cell is larger than a laser beam in size for random phase modulation or retardation. Light loss due to diffraction and scattering are substantially eliminated in the absence of pixel structures. In another embodiment, the input electrode is divided into two separate parts. Vertically aligned liquid crystal molecules rotate and follow field fringes created by applying a first voltage to the input electrodes. Additional embodiments include a device that has two wedge-shaped liquid crystal layers, a device that includes plural field-induced gradient index prisms, a device including a tilted mirror, and composite devices.

7 Claims, 5 Drawing Sheets

(56) References Cited

U.S. PATENT DOCUMENTS 7,742,217 B2 6/2010 Kamm et al.
2007/0013849 A1* 1/2007 Ong .............................. 349/129
2007/0273849 A1* 11/2007 Takeda ......................... 353/122
2008/0106779 A1 5/2008 Peterson et al.

* cited by examiner

METHOD FOR DESPECKLING IN LASER DISPLAY SYSTEMS

CROSS-REFERENCE TO RELATED APPLICATIONS

This application is a divisional of U.S. patent application Ser. No. 12/052,377, filed Mar. 20, 2008, entitled "APPARATUS FOR DESPECKLING IN LASER DISPLAY SYSTEMS," which claims the benefit of U.S. Provisional Application Ser. No. 60/895,933, filed Mar. 20, 2007, entitled "APPARATUS FOR DESPECKLING IN LASER DISPLAY SYSTEMS." The aforementioned related applications are hereby incorporated by reference.

FIELD OF THE INVENTION

This invention relates, generally, to image projection systems that use lasers as an illumination source. More particularly, this invention relates to an apparatus that inhibits the speckling caused by lasers in such image projection systems.

DESCRIPTION OF THE PRIOR ART

The high coherence of laser light causes the speckle phenomenon in laser-illuminated systems. Speckle appears as a stationary pattern of light with dark spots superimposed over a viewable image.

One prior art device includes high speed rotating mirrors to move a laser beam on a screen very quickly. Folding mirrors are mechanically perturbed to disturb a portion of the system for temporally smearing the speckle effects. It involves moving parts such as a plurality of piezoelectric actuators.

Another prior art device employs a multi-region phase modulator array across a laser beam with different phase shift values at a frequency sufficiently higher than the flicker fusion rate of the human eye to remove the perception of speckling artifacts which would otherwise appear due to the coherency of laser light. The pixilated structures introduce light loss from diffraction and scattering.

It would therefore be advantageous if such speckle could be reduced or eliminated by a compact device having no moving parts.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for an apparatus and method for reducing or eliminating speckle in laser-illuminated systems is now met by a new, useful, and non-obvious invention.

The inventive optical devices employ liquid crystal layers and introduce random phase modulation or beam shifting to eliminate the speckles in laser display systems. In a first embodiment, the liquid crystal layer is built in a single cell with a size larger than the laser beam. No pixilated structures are involved and therefore much less diffraction or scattering loss of laser light occurs, thereby providing high efficiency.

A device that provides random phase modulation includes two (2) conductive electrodes disposed in sandwiched relation to a liquid crystal layer. The liquid crystal molecules align vertically when an electric field is applied. When the voltage is removed, the liquid crystal molecules are randomly oriented due to the absence of alignment layers. This causes random phase retardation due to the birefringence of the liquid crystal material and also introduces random phase modulation across the input laser beam.

A vertically aligned liquid crystal layer can also be used. In the absence of an electrical field, the device is transparent and there is no phase modulation of the input laser beam. When an electric field is applied, the liquid crystal molecules are oriented in different directions and therefore introduce varied phase modulation to the waveform of the input laser beam. The amount of phase modulation is adjustable or controllable, depending on the level of the applied voltage and corresponding frequency.

The device is normally "off" and may save energy because phase modulation is introduced only when necessary.

Beam shifting that causes variations of optical path lengths is an alternative to localized phase modulation for removing speckles. Beam shifting includes slightly steering the propagation direction of a laser beam or linear moving of the laser beam perpendicular to the propagation direction.

More particularly, in the first embodiment, a liquid crystal cell is formed by vertically oriented liquid crystal molecules and randomly oriented liquid crystal molecules. The liquid crystal cell is disposed in sandwiched relation between an input electrode and a ground electrode and a first and a second glass cover are disposed in overlying relation to the input and ground electrodes, respectively. The liquid crystal cell is larger than a laser beam in size so that a laser beam follows a path of travel through the device. Diffraction and scattering loss of light are substantially eliminated in the absence of pixel structures.

In a second embodiment, a layer of nematic liquid crystal molecules is disposed in sandwiched relation between an input electrode and a ground electrode. A first cover glass and a second cover glass are disposed in overlying relation to the input and ground electrodes, respectively. The nematic liquid crystal molecules are oriented in random distribution when no voltage is applied to the input and ground electrodes and said nematic liquid crystal molecules are oriented in vertically oriented distribution when a voltage is applied to the input and ground electrodes.

A third embodiment has the same structure as the second embodiment, but the liquid crystal molecules are oriented in vertically oriented distribution when no voltage is applied to the input and ground electrodes and said liquid crystal molecules are oriented in different directions when a voltage is applied to said input and ground electrodes.

A fourth embodiment includes a layer of vertically aligned liquid crystal molecules, a first input electrode disposed in overlying relation to a first side of the layer of vertically aligned liquid crystal molecules, and a second input electrode disposed in overlying relation to the first side of said layer of vertically aligned liquid crystal molecules. The second input electrode is laterally spaced apart from the first input electrode. A ground electrode is disposed in overlying relation to said second side of said layer of vertically aligned liquid crystal molecules, a first cover glass is disposed in overlying relation to the first and second input electrodes and a second cover glass is disposed in overlying relation to the ground electrode. A voltage is applied to the first and second input electrodes and the vertically aligned liquid crystal molecules rotate and follow field fringes created by applying said voltage to said first and second input electrodes.

A fifth embodiment includes a first spacer having a first diameter and a second spacer having a second diameter greater than the first diameter. The first and second spacers are disposed in longitudinally spaced apart relation to one another. An input electrode is supported at its opposite ends by the first and second spacers and a ground electrode is supported at its opposite ends by the first and second spacers in diametrically opposed relation to the input electrode so that the input and ground electrodes are disposed in oblique relation to one another. A first cover glass is disposed in overlying relation to the input electrode and a second cover glass is disposed in overlying relation to the ground electrode. A layer of liquid crystal molecules is disposed between the input and ground electrodes. A first wedge-shaped beam-shifting device is formed by the first and second cover glasses, the input and ground electrodes, and the layer of liquid crystal molecules disposed between the input and ground electrodes.

A second wedge-shaped beam-shifting device has a structure identical to the first wedge-shaped beam-shifting device and is disposed relative to the first wedge-shaped beam-shifting device such that the second cover glass of the first wedge-shaped beam-shifting device abuts the first cover glass of the second wedge-shaped beam-shifting device. A laser beam following a path of travel through the first and second wedge-shaped beam-shifting devices is linearly shifted in a direction perpendicular to the path of travel.

A sixth embodiment includes a first field-induced gradient index prism disposed between a first input electrode and a first ground electrode so that when voltage is applied to the electrodes an electric field is at a maximum strength at the first input electrode and drops gradually towards zero (0) at the first ground electrode. A second field-induced gradient index prism is disposed between a second input electrode and a second ground electrode so that when voltage is applied to said second electrodes an electric field is at a maximum strength at the second input electrode and drops gradually towards zero (0) at the second ground electrode. The first and second field-induced gradient index prisms are disposed in opposing relation to one another so that a thickest end of the first field-induced gradient index prism is aligned with a thinnest end of the second field-induced gradient index prism. A laser beam that follows a first path of travel that intersects the device at a ninety degree) (90°) angle when no voltage is applied to the electrodes is shifted slightly from the first path of travel when voltage is applied to the electrodes. Rapid application and removal of a voltage to the electrodes substantially eliminates speckles from the laser beam.

In a seventh embodiment, a mirror is positioned at a forty five degree (45°) angle so that a path of travel of a reflected laser beam is bent ninety degrees (90°) from an input laser beam. A liquid crystal layer of uniform thickness is positioned in sandwiched relation between a pair of electrodes. The liquid crystal layer and the pair of electrodes is positioned in sandwiched relation between the mirror and a cover glass so that linear beam shifting is accomplished by rapid alternating application and removal of voltage to and from the electrodes, respectively.

In an eighth embodiment, a mirror is positioned at a forty five degree (45°) angle so that a path of travel of a reflected laser beam is bent ninety degrees (90°) from an input laser beam. A liquid crystal layer of uniform thickness is positioned in sandwiched relation between a pair of electrodes. A cover glass is positioned in sandwiched relation between the mirror and liquid crystal layer and the pair of electrodes so that linear beam shifting is accomplished by rapid alternating application and removal of voltage to and from the electrodes, respectively.

A ninth embodiment is an integrated device for despeckling in laser display systems.

It includes at least a first and a second device for reducing speckles in the system. The first and second devices are disposed parallel to one another and perpendicular to a path of travel of a laser beam so that multi-function and high-speed modulation is provided to eliminate speckles in laser-illuminated display systems.

The primary object of this invention is to provide a solid state electro-optical solution to the despeckling problem.

Another object is to solve the despeckling problem with a non-mechanical means that is robust and requires low operating voltage.

Yet another object is to solve said problem with high transparence and high efficiency.

Still further objects are to solve said problem with a low power consumption device that is compact, simple, and that has a low cost when produced in high volume.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

The text accompanied by FIGS. 1-4 relates to the subject of phase modulation across the beam.

Figure 1:
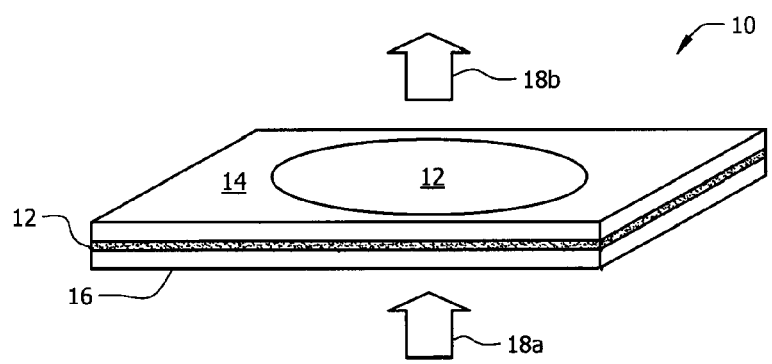
FIG. 1 is a diagrammatic perspective view of a first embodiment of the novel despeckling apparatus.

Referring now to FIG. 1, it will there be seen that an illustrative embodiment of the invention is denoted as a whole by the reference numeral 10.

Apparatus 10 removes speckles by randomly varying the phase or waveform across a laser beam. A single liquid crystal cell 12 is positioned between two (2) glass substrates 14, 16, both of which have flat surfaces. The liquid crystal molecules of liquid crystal cell 12 are either randomly or vertically oriented. Cell 12 is larger in size than input laser beam 18a and therefore no pixel structures are required to eliminate or substantially inhibit diffraction or scatter loss of laser light. The output laser beam is denoted 18b. There are no alignment layers; accordingly, the need for a polyimide rubbing process is also eliminated. The input and ground electrodes that sandwich the liquid crystal layer in FIG. 1 are not depicted to simplify the drawing.

Figure 2A:
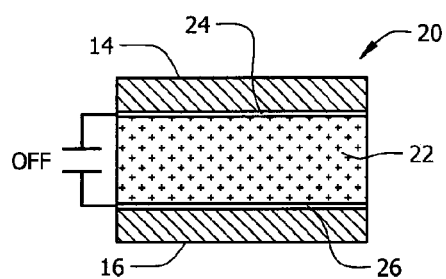
FIG. 2A is a sectional view of a second embodiment.
Figure 2B:
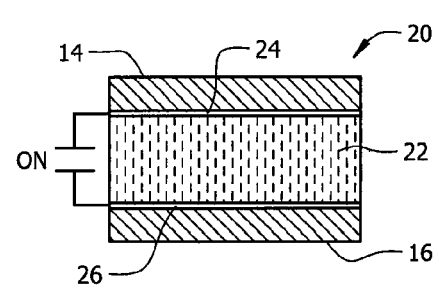
FIG. 2B is a sectional view of the second embodiment.

FIGS. 2A and 2B depict a liquid crystal device 20 having a nematic liquid crystal layer 22 sandwiched between input electrode 24 and ground electrode 26. Cover glasses 14, 16 overlie said electrodes 24 and 26, respectively. FIG. 2A depicts the random alignment of the liquid crystal molecules when no voltage is applied and FIG. 2B depicts the vertical alignment thereof when voltage is applied. No rubbing and pre-alignment are involved. The orientation of the incident laser beam is not important.

Figure 3A:
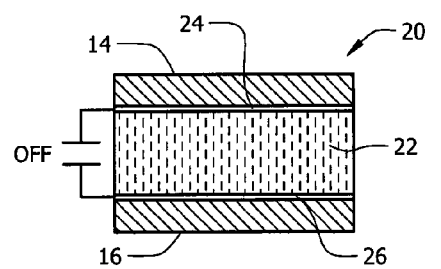
FIG. 3A is a sectional view of a third embodiment.
Figure 3B:
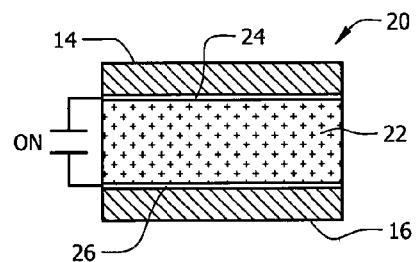
FIG. 3B is a sectional view of the third embodiment.

The liquid crystal device 20 depicted in FIGS. 3A and 3B functions in a reverse manner vis a vis the device of FIGS. 2A and 2B. As depicted in FIG. 3A, when no voltage is applied, the device has a vertically aligned liquid crystal layer 22 between cover glasses 14, 16. Transparent ITO (Indium Tin Oxide) 28 is deposited on glass covers 14, 16. The vertical alignment of FIG. 3A allows coherent light to travel therethrough in the absence of phase modulation. As depicted in FIG. 3B, the liquid crystal molecules are oriented in different directions when a voltage is applied.

Figure 4:
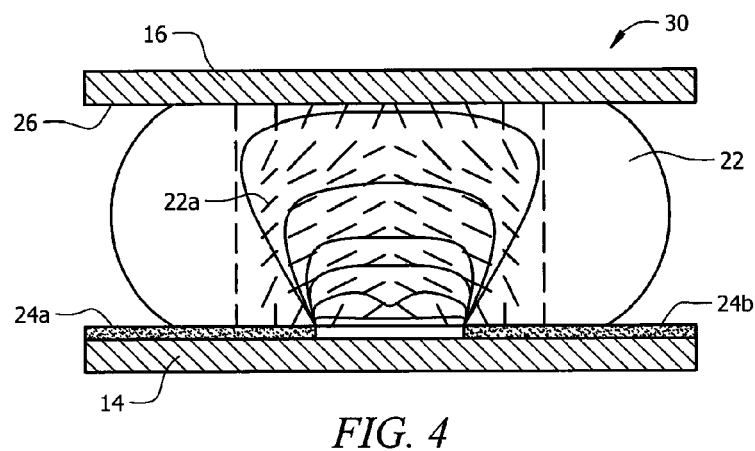
FIG. 4 is a sectional view of a fourth embodiment.

Device 30, depicted in FIG. 4, provides phase modulation by applying an electric field to two (2) input electrodes 24a, 24b deposited on cover glass 14. When a voltage is applied, the vertically aligned liquid crystal molecules rotate and follow the field fringes between the two (2) input electrodes as indicated by inclined hash marks 22a.

Figures 5A, 5B:
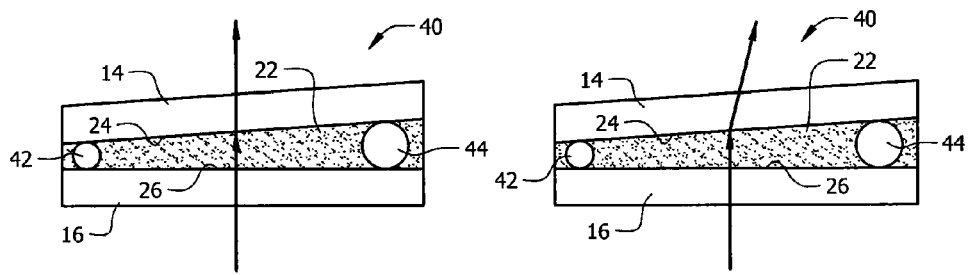
FIG. 5A is a sectional view of a fifth embodiment.
FIG. 5B is a sectional view of the fifth embodiment.
Figure 6:
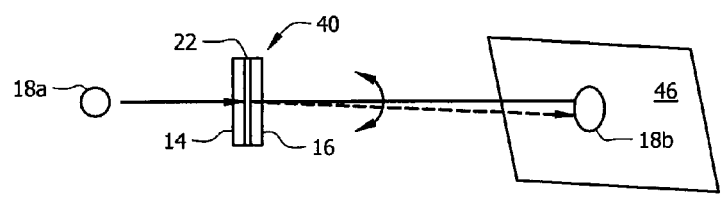
FIG. 6 is a diagrammatic view depicting the performance of the fifth embodiment.

The text accompanying FIGS. 5 and 6 relates to the subject of angular beam shifting.

FIGS. 5A and 5B depict liquid crystal device 40 for introducing angular deviation of a laser beam. Spacers 42, 44 of differing sizes are used to form liquid crystal layer 22 having a generally wedged or tapered shape.

The index of refraction of the liquid crystal molecules varies when a voltage is applied to or removed from electrodes 24, 26. The incident beam is steered in a very small angle as depicted in FIG. 6 where the solid line represents the path of travel of laser light when voltage is applied to electrodes 24, 26 and the dotted line represents the path of travel of said laser light when no voltage is applied to said electrodes. This changes the light distribution on screen 46 and therefore removes speckles. The angular shift of input laser beam 18a is controlled with precision so that the size increase of output laser beam 18b is small and does not affect the resolution of the display.

The text accompanying FIGS. 7-11 relates to the subject of linear beam shifting.

In angular beam shifting, the size of the output laser beam varies, depending on the propagation distance. Constant beam size is achieved with linear beam shifting.

Figure 7:
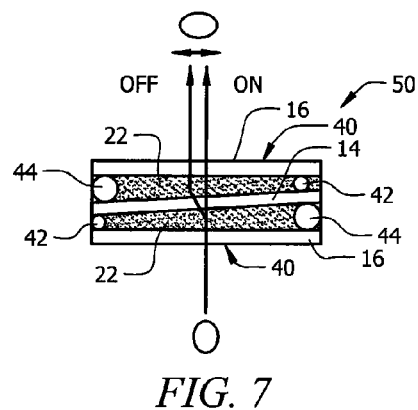
FIG. 7 is a side elevational view of a sixth embodiment.

A linear beam shifting device 50 having two (2) wedged liquid crystal layers 40, 40 is depicted in FIG. 7, said layers 40, 40 being the same structures depicted in FIGS. 5A, 5B, and 6. In a first state, the molecules in the liquid crystal layer are vertically aligned. A laser beam therefore travels through it in the absence of modulation. In a second state, the index of the liquid crystal layers changes as no voltage is applied to electrodes 24, 26 and two (2) liquid crystal layers are formed. The two (2) liquid crystal wedges are identical but oppositely oriented. Accordingly, the output laser beam has a linear shift in the direction perpendicular to beam propagation as clearly indicated by the solid and dotted paths of travel in FIG. 8. The beam shifts continuously between the "on" and "off" states.

Thus, output laser beam 18b has a larger size or footprint than input laser beam 18a. The amount of beam shifting is very small and controllable.

Figure 8A:
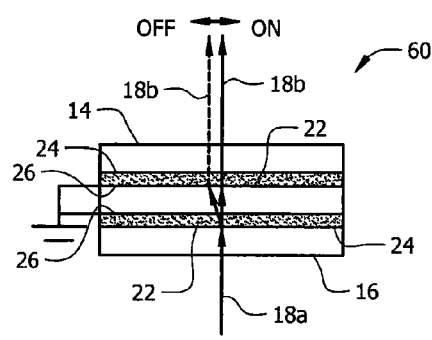
FIG. 8A is a sectional view of a seventh embodiment.
Figure 8B:
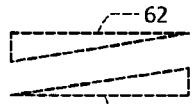
FIG. 8B is a side elevational view of a first field-induced gradient index prism used in said seventh embodiment.
Figure 8C:
FIG. 8C is a side elevational view of a second field-induced gradient index prism used in said seventh embodiment.

Such beam shifting can also be realized by employing two (2) field-induced, gradient-index prisms 62, 64 as depicted in FIGS. 8A-C. Electrodes 26, 26 on a first side of device 60 are grounded as depicted in FIG. 8A. Accordingly, the electric field is at a maximum strength at the input electrodes 24, 24 and drops gradually towards zero (0) at grounded electrodes 26, 26. This introduces a gradient index distribution across liquid crystal layers 22, 22. The liquid crystal layers therefore function as optical prisms 62, 64, and shift the laser beam quickly between the "on" and "off" states as indicated in FIG. 8A.

Figure 9:
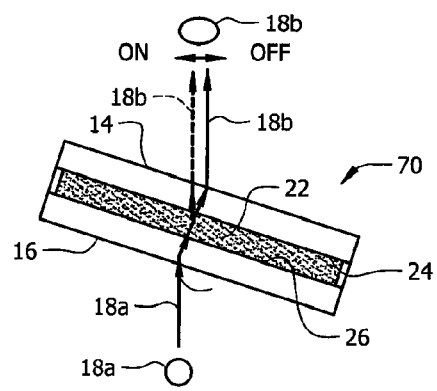
FIG. 9 is a sectional view of an eighth embodiment.

Beam shifting can also be accomplished by tilting liquid crystal device 70 having a uniform liquid crystal layer 72 as depicted in FIG. 9. Switching liquid crystal device 70 "on" and "off" changes the index of refraction of liquid crystal layer 72. This change in the index of refraction causes a linear shift in input laser beam 18a as depicted. The same effect is achieved by physically tilting device 70 first in a first upwardly inclined plane and secondly in a second downwardly inclined plane without switching device 70 "on" and "off," i.e., without alternately applying and removing a voltage to electrodes 24 and 26.

Figure 10A:
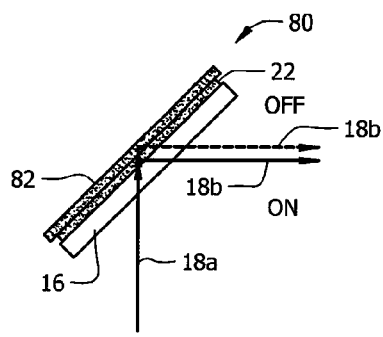
FIG. 10A is a diagrammatic side elevational view of a ninth embodiment.
Figure 10B:
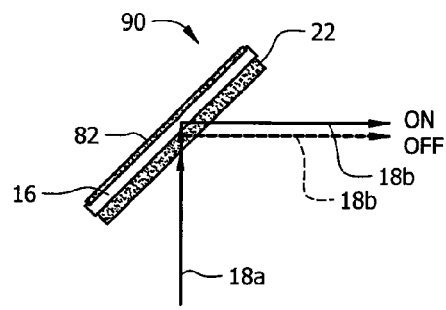
FIG. 10B is a diagrammatic side elevational view of a tenth embodiment.

FIGS. 10A and 10B depict devices 80 and 90, respectively, for linearly shifting a laser beam. The reflection arrangement affects an optical path difference. This enables formation of thin layers of liquid crystal 22 so that the device can be switched faster. The reflection configurations are also applicable for random phase modulation and angular steering of laser beams.

More particularly, in FIG. 10A a layer of liquid crystal molecules 22 is sandwiched between mirror 82 and cover glass 16. The electrodes that sandwich liquid crystal molecules 22 are not depicted to simplify FIG. 10A.

The embodiment of FIG. 10B differs from the embodiment of FIG. 10A in that cover glass 16 and the layer of liquid crystal molecules 22 is reversed. The electrodes that sandwich liquid crystal molecules 22 are not depicted to simplify FIG. 10B.

Figure 11:
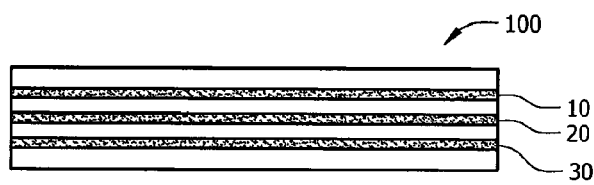
FIG. 11 is a diagrammatic side elevational view of an eleventh embodiment.

Device 100 of FIG. 11 is built by integrating together multiple devices such as devices 10, 20, and 30 of FIGS. 1, 2A and 2B, and 3A and 3B, respectively, for multi-function and high-speed modulation to eliminate speckles in laser-illuminated display systems.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method for providing a display device comprising the steps of:
   providing a laser beam; and
   despeckling the laser beam using the steps of:
      providing a liquid crystal cell comprising a layer of liquid crystal molecules that are selectively operable in first and second states such that one of the first and second states corresponds to the liquid crystal cell having vertically oriented liquid crystal molecules in the layer, and another of the first and second states corresponding to the liquid crystal cell having randomly oriented liquid crystal molecules in the layer;

passing the laser beam through the liquid crystal cell;

providing a first electrode and a second electrode to the liquid crystal cell, the layer of liquid crystal molecules disposed uniformly between and in contact with the first and second electrodes; and applying a voltage to and removing the voltage from the first electrode and second electrode for operating the liquid crystal cell between the first and second states to despeckle the laser beam.

2. A method for providing a display device as in claim 1, further comprising the steps of:

vertically orienting the liquid crystal molecules in the layer in the first state and randomly orienting the liquid crystal molecules in the layer in the second state;

sizing the liquid crystal cell so it is larger than the laser beam in size; and substantially eliminating diffraction and scattering loss of light in the absence of pixel structures.

3. A method for providing a display device as in claim 1, wherein the liquid crystal molecules in the layer are nematic liquid crystal molecules.

4. A method for providing a display device as in claim 1, further comprising the steps of:

disposing a first cover glass and a second cover glass in overlying relation to the first and second electrodes, respectively;

orienting the liquid crystal molecules in the layer in the first state when no voltage is applied to the first and second electrodes; and orienting the liquid crystal molecules in the layer in the second state when a voltage is applied to the first and second electrodes.

5. A method for providing a display device as in claim 1, further comprising the steps of:

vertically aligning the liquid crystal molecules in the layer;

disposing the first electrode in overlying relation to a first portion of a first side of the layer of vertically-aligned liquid crystal molecules;

disposing a third electrode in overlying relation to a second portion of the first side of the layer of vertically-aligned liquid crystal molecules;

laterally spacing the third electrode apart from the first electrode;

disposing the second electrode in overlying relation to a second side of the layer of vertically-aligned liquid crystal molecules;

disposing a first cover glass in overlying relation to the first and second electrodes;

disposing a second cover glass in overlying relation to the second electrode; and rotating the vertically-aligned liquid crystal molecules in the layer to follow field fringes created when a voltage is applied across the first and third electrodes.

6. A method of operating a display device, comprising the steps of:

providing a liquid crystal cell, the liquid crystal cell comprising a layer of liquid crystal molecules that are selectively operable in first and second states, one of the first and second states corresponding to the liquid crystal cell having vertically oriented liquid crystal molecules in the layer, and another of the first and second states corresponding to the liquid crystal cell having randomly oriented liquid crystal molecules in the layer, the liquid crystal cell having no alignment layers and no pixels;

providing the liquid crystal cell with a first electrode and a second electrode, the layer of liquid crystal molecules disposed uniformly between and in contact with the first and second electrodes;

passing a laser beam through the liquid crystal cell; and successively applying a voltage to and removing the voltage from the first electrode to the second electrode such that the liquid crystal cell operates to reduce speckling and to provide a coherent laser beam output.

7. A method of operating a display device by despeckling a laser beam upon passing through a liquid crystal cell having no alignment layers or pixel electrodes, comprising the steps of:

providing a liquid crystal cell, the liquid crystal cell comprising a layer of liquid crystal molecules that are selectively operable in first and second states, one of the first and second states corresponding to the liquid crystal cell having vertically oriented liquid crystal molecules in the layer, and another of the first and second states corresponding to the liquid crystal cell having randomly oriented liquid crystal molecules in the layer, providing the liquid crystal cell with a first electrode, a second electrode, and a voltage source in switched electrical communication with the electrodes, the layer of liquid crystal molecules disposed uniformly between and in contact with the first and second electrodes;

passing a laser beam through the liquid crystal cell;

successively applying a voltage to and removing the voltage from the first electrode and second electrode such that the liquid crystal cell operates between the first and second states to despeckle and to provide a coherent laser beam output.

* * * * *